United States Patent [19]

Uno et al.

[11] Patent Number: 5,239,789
[45] Date of Patent: Aug. 31, 1993

[54] VIBRATION DAMPING SYSTEM

[75] Inventors: Nayomon Uno, Hasuda; Masao Mutaguchi, Yotsukaidou, both of Japan

[73] Assignee: Ishikawajima-Harima Heavy Industries Co., Ltd., Tokyo, Japan

[21] Appl. No.: 950,102

[22] Filed: Sep. 23, 1992

Related U.S. Application Data

[62] Division of Ser. No. 394,043, Aug. 15, 1989, Pat. No. 5,182,887.

[30] Foreign Application Priority Data

Oct. 6, 1988 [JP] Japan ............................ 63-250955

[51] Int. Cl.$^5$ ................................. E04H 9/02
[52] U.S. Cl. ........................ 52/1; 52/167 R; 52/167 DF; 52/167 RM
[58] Field of Search ............... 52/1, 167 R, 167 RM, 52/167 DF

[56] References Cited

U.S. PATENT DOCUMENTS

| | | | |
|---|---|---|---|
| 4,286,693 | 9/1981 | Sulzer | 52/167 |
| 4,687,174 | 8/1987 | Helary et al. | 52/167 |
| 5,182,887 | 2/1993 | Uno et al. | 52/167 R |

FOREIGN PATENT DOCUMENTS 62-62036 8/1987 Japan .

*Primary Examiner*—Richard E. Chilcot, Jr.
*Assistant Examiner*—Christopher Todd Kent
*Attorney, Agent, or Firm*—Gossett Dykema

[57] ABSTRACT

A vibration damping system adapted for use on top of a structure, comprises: a weight disposed on the top of the structure in a manner such that it can undergo simple harmonic oscillation; an acceleration sensor provided at the structure top for detecting the structure vibration in terms of acceleration; a weight driving mechanism for actuating the weight into the simple harmonic oscillation; and a phase and amplitude controller assembly for performing integration twice on the signal coming from the acceleration sensor, once to obtain the velocity signal, then to obtain the displacement signal, for reversing the sign of the velocity signal when the velocity signal exceeds a predetermined value, and for controlling the weight driving mechanism on the basis of the sign-reversed velocity signal so as to attenuate the vibration of the structure by giving the energy of the weight performing simple harmonic oscillation under control of the phase and amplitude controller assembly to the structure in optimum timing and with an optimum magnitude.

3 Claims, 10 Drawing Sheets

FIG.6
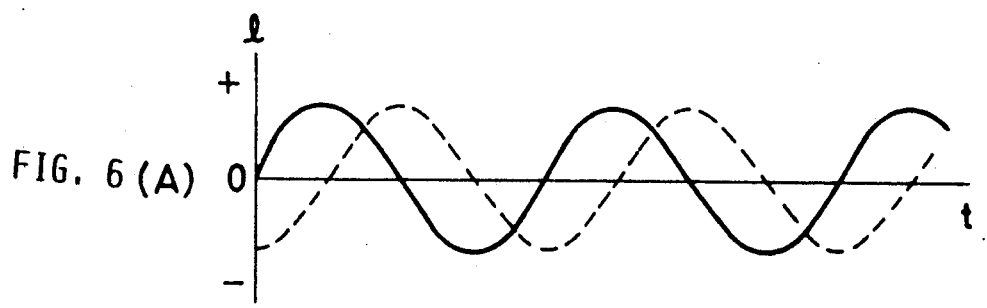
FIG. 6(A)
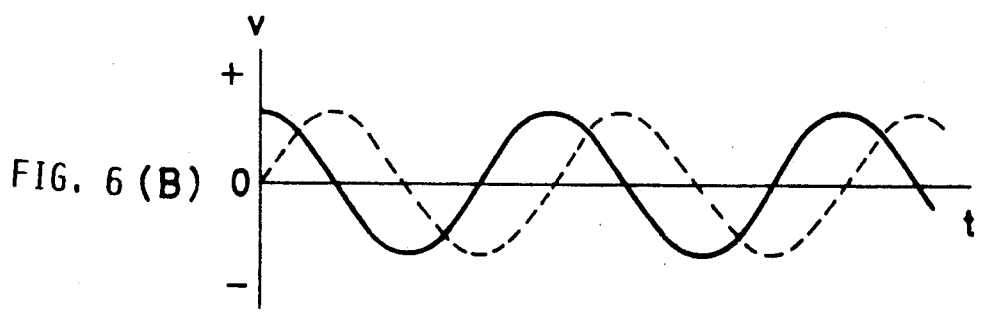
FIG. 6(B)
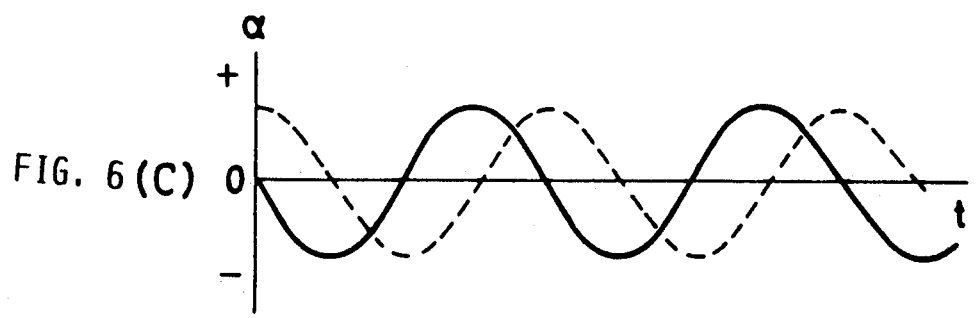
FIG. 6(C)

VIBRATION DAMPING SYSTEM

This is a divisional application of U.S. patent application Ser. No. 07/394,043 filed Aug. 15, 1989 now U.S Pat No. 5,182,887.

BACKGROUND OF THE INVENTION

Technical Field

The present invention relates to a vibration damping system adapted for use with a structure. More particularly, it relates to a vibration damping system placed at the top of a structure such as a tower of a suspension bridge, a skyscraper, a steel tower, for attenuating vibrations due to wind loads (aerodynamic forces) or an earthquake.

Background Art

At least four varieties of the abovementioned vibration damping system are currently known.

The first is shown in FIG. 13 of the accompanying drawings, and is disclosed in Japanese Patent Application No. 60-92569. In this construction, there is provided a damping device 58 that comprises a device 50 for detecting the vibration amplitude of the vibrating body 52 (this device will be referred to as "vibration sensor" hereafter), an actuator 54 that applies a damping force on the vibrating body 52 corresponding to the vibration amplitude the vibration sensor 50 has detected, and an added mass 56 that balances the damping force as it acts on the vibrating body 52. A stopper unit 60 breaks up excessive motion of the added mass 56, and a damper unit 62 absorbs the impact the added mass 56 exerts on the stopper unit 60.

The second is shown in FIG. 14 of the accompanying drawings and is disclosed in Japanese Patent Application No. 60-92570. This application discloses a system comprising an added mass actuator 66 that is mounted on the structure 64, a vibration sensor 68 that detects the vibration of the structure 64, a controller 70 that outputs control signals on the basis of the signal that the vibration sensor 68 generates, and an added mass actuator 66 that operates under control of the controller 70 so as to damp out the vibration of structure 64. The electric power to be supplied to the added mass actuator 66 is controlled by the timer 76 and on the basis of the output of a structural vibration prediction sensor composed of an earthquake sensor 72 that is set on the ground and a logic circuit 74.

The third is shown in FIGS. 15A and 15B of the accompanying drawings and is disclosed in Japanese Patent Application No. 59-97341. The construction in this prior application comprises an added mass 82 which is placed motion-free on the top 80 of the structure 78, an actuator 88 which drives the added mass 82 and which has its stationary arms 84 affixed to the protrusion 86 extending from the top 80, a controller 90 for controlling the actuator 88, a vibration sensor 92 affixed to the structure 78 for detecting the structure vibration, a ground vibration sensor (an earthquake sensor) 96 set on the foundation 94 of the structure 78 for detecting the ground vibration, and a subtractor 98 for subtracting the output signals of the earthquake sensor 96 from the output signals of the vibration sensor 92, and obtaining the input signals for the controller 90.

The fourth is shown in FIG. 16 of the accompanying drawings and is disclosed in Japanese Patent Application No. 60-85165. The construction disclosed in this prior application is a system comprising an added mass actuator 102 attached to the structure 100, and a vibration sensor 104 for detecting vibration of the structure 100, wherein the added mass actuator 102 is driven by a controller 106 and a power source 108 on the basis of the signals from the vibration sensor 104. A band pass filter 110 is provided between the vibration sensor 104 and the added mass actuator 102.

Several deficiencies are evident in the above described constructions. For example, the construction of FIG. 13 is structurally complex because of the provision of the stopper unit 60 and related components; the construction of FIG. 14 requires a complicated controller because of the need for setting the earthquake sensor 72 on the ground; the construction of FIGS. 15A and 15B necessarily calls for duplex vibration sensors because of the use of the subtractor 98; and the construction of FIG. 16 has to bear the burden of a superfluous circuitry because of the presence of the band pass filter 110. In none of these disclosures, moreover, is the method of controlling the actuator present in concrete terms, and further the phase relationship between the vibration of the structure and the actual movement of the damping device is left unclear.

SUMMARY OF THE INVENTION

A purpose of the present invention is to suppress the vibration of the structure by controlling, using simple circuits, the motion of a weight into optimum phase relationship with regard to the vibration of the structure so as to deprive the structure of its kinetic energy by giving the kinetic energy of the weight to the structure, thereby solving all the problems the prior art arrangements have.

In one of the preferred embodiments of the present invention, we offer a construction comprising a weight set at the top of the structure so as to perform a simple harmonic oscillation, an actuator that drives the weight, an acceleration sensor that works as a detector of the structure vibration, and a phase and amplitude controller assembly that reverses the sign of the signal of the acceleration sensor and transmits it to the actuator as the command signal. Here, the phase and amplitude controller assembly comprises a first integrator that converts the acceleration signal coming from the acceleration sensor into a velocity signal, a second integrator that converts the velocity signal of the first integrator into a displacement signal, a comparator that compares the displacement signal coming from the second integrator with a predetermined limit value, an amplifier that reverses the sign of the signal output from the first integrator, and a relay which allows the sign-reversed signal to reach the actuator as a weight actuation command when the comparator finds that the displacement signal is greater than the limit value.

That is to say, as the vibration of the structure is detected by the vibration sensor, that signal is input to the weight actuator after having been phase and amplitude controlled by the phase and amplitude controller. Since the energy given to the weight in the form of simple harmonic oscillation, which is phase-retarded by 90 degrees with respect to the structural vibration, is transferred to the structure with the most optimal timing and magnitude, the vibration of the structure is quickly damped out.

BRIEF DESCRIPTION OF THE DRAWINGS

FIG. 6 is a set of line diagrams showing the relationships between movement of the weight of this invention and the structure vibration in terms of displacement in (A), of velocity in (B), and of acceleration in (C);

DESCRIPTION OF THE PREFERRED EMBODIMENTS

Now we shall disclose the present invention by means of preferred embodiments, referring to the attached Figures.

Figure 1:
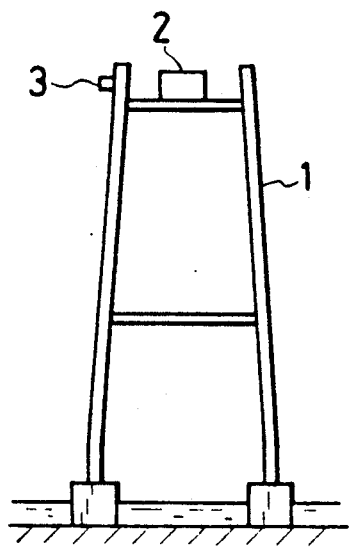
FIG. 1 is a schematic view showing a vibration damping system mounted on a suspension bridge tower according to the present invention.

FIG. 1 shows a manner of attaching a structure damping system 2 to a tower 1 of a suspension bridge, which represents those structures that vibrate due to an externally applied force. At the top of the tower 1, there is provided the damping system 2, and on a top side of the tower 1, there is mounted a vibration sensor 3.

Figure 2:
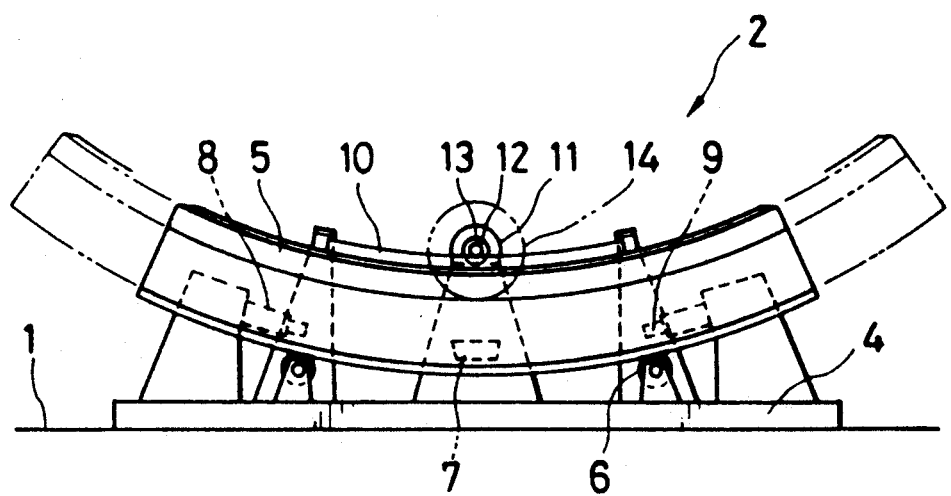
FIG. 2 is a front view of the damping device for structures.

To describe the damping system 2 in detail, in FIG. 2, on the platform 4 that is placed atop the tower 1, there is provided a slender weight 5 that is formed into an arc and set so as to perform a simple harmonic oscillation (a pendulum motion) as supported by support rollers 6 in the direction of the sway of tower 1, making up a spring system that works under the restoration force due to gravity. The range of oscillation of the weight 5 is limited to the distance the protrusion 7, provided at a side center (or protrusions at either side) of the weight 5, is allowed to travel until it is arrested by the buffers 8 and 9 that are set at either end of the platform 4. On the top of the weight 5, moreover, there is provided a rack 10, lying in the oscillation direction of the weight 5. The items 4, 6, 7, 8, 9, 10, 11, 12, 13 serve in combination as a weight driving mechanism.

Figure 3:
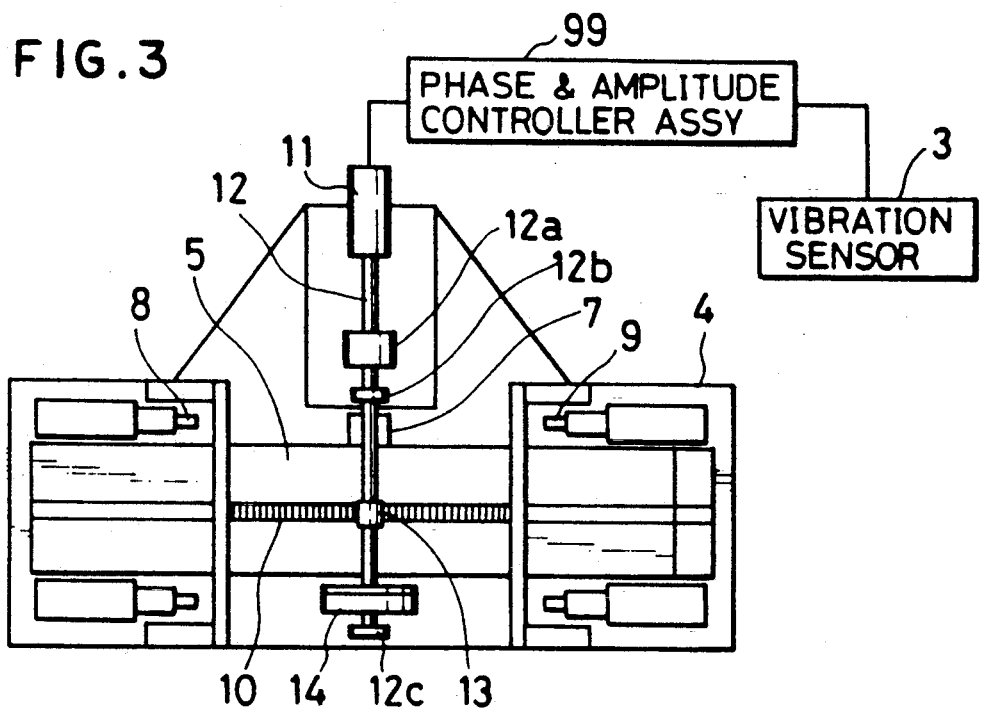
FIG. 3 is a top plan view of FIG. 2.

In FIG. 3, a shaft 12 is attached directly to the motor 11, extending at right angles beyond the rack 10. At a mid point of the shaft 12, a pinion 13 engages the rack 10. Near the extended end of the shaft 12, moreover, an oscillation period adjusting weight 14 is provided so as to adjust the oscillation period of the weight 5 by its rotation inertia. Namely, the motor 11 drives the weight 5 into an oscillation of given period via the shaft 12, pinion 13, and rack 10, and aided by the oscillation period adjusting weight 14. The shaft 12 is also provided with a damper 12a and supported by bearings 12b and 12c.

To the vibration sensor 3, on the other hand, a phase and amplitude controller assembly 99 is connected to phase and amplitude control the signal from the vibration sensor 3, while driving the motor 11 by its output phase signal. Thus, by appropriately phase and amplitude controlling the simple harmonic oscillation of the weight 5 with respect to the vibration of the tower 1, using the driving force of the motor 11, we are able not only to hold the sway of the tower 1 to an allowable range, but to make the tower 1 dissipitated its kinetic energy.

Here, we emphasize the fact that the driving force of the motor 11 can act both as a force to accelerate the weight 5 and as an attenuation force to apply brake on the weight 5 so that it will maintain the amplitude needed. That is to say, unless an appropriate control is performed, the energy given to the weight 5 in the form of simple harmonic oscillation by the swaying tower 1 will diverge, so we are employing the motor 11 for the double duties of accelerating the weight 5 to the amplitude needed and of braking it to prevent occurrence of divergence.

Figure 4:
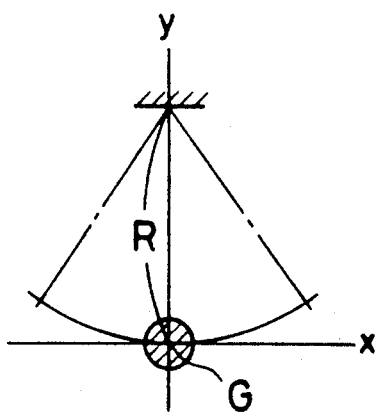
FIG. 4 is a diagram showing a pendulum oscillation system.

Then, regarding the weight 5 as a pendulum as shown in FIG. 4, we calculate its period of natural oscillation T and its vertical displacement y:

$$T = 2\pi \cdot \sqrt{(R/g)},$$
$$R = (T/2\pi)^2 \cdot g = \omega^2 \cdot g,$$

and $$y = \frac{kx^2}{2mg} = \frac{m\omega^2 x^2}{2mg} = \frac{\omega^2 x^2}{2g}$$

where R represents a distance to the center of gravity G, x a horizontal displacement, m a mass of the weight, $\omega$ is the natural frequency, and k is a spring constant.

Figure 5:
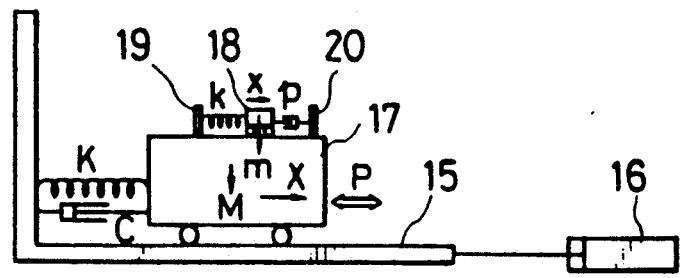
FIG. 5 is a diagram showing the principle of the present invention with a model.

Now, to explain the principle of the phase controlling of this invention, in FIG. 5, reference numeral 15 designates a table to be shaked by an actuator 16; 17 a test body that is placed motion-free on the shaking table 15 (the body 17 corresponds to the tower 1 of FIG. 1); 18 a weight (representing the weight 5 of FIG. 2); and 19 and 20 brackets. Here, if the aerodynamic force (wind load) acting on the body 17 is represented by P; the mass of the body 17 by M; the equivalent or reduced spring constant of the body 17 by K; the attenuation coefficient of the body 17 (i.e., the added attenuation constant, which, is equal to 2M·h·$\omega$) by C where $\omega$ is a natural frequency and h represents an attenuation coefficient of the structure, for instance h=0.01–0.02 in case of buildings and =0.1–0.2 in case of bridge; the horizontal linear displacement of the body 17 (in an absolute coordinate system) by X; the mass of the weight 18 by m; the spring constant of the weight 18 by k; the force that controls oscillation of the weight 18 by p; and the horizontal linear displacement of the weight 18 (in a relative coordinate system with regard to the body 17) by x; then the motion equations of the body 17 and the weight 18 are:

$$M\ddot{X} + C\dot{X} + kX + m \cdot (\ddot{X} + \ddot{x}) = P \cdot \cos \omega t, \quad (1)$$

and $$m\ddot{X} + m\ddot{x} + kx = p(t), \quad (2)$$

where t represents time.

Assuming further that the body 17 and the weight 18 are performing a simple harmonic oscillation, $$X = A \cdot \sin \omega t, \quad (3)$$

and $$x = B \cdot \sin (\omega t + \alpha), \quad (4)$$

where A and B are amplitudes, and $\alpha$ is the phase difference to $\omega t$.

Since the spring constants K and k are related to the masses M and m as:

$$K = (M + m) \cdot \omega^2, \quad (5)$$

and $$k = m\omega^2, \quad (6)$$

hence, $$\begin{aligned}(M + m) \cdot \ddot{X} + KX &= -(M + m) \cdot A\omega^2 \cdot \sin\omega t \\ &\quad + (M + m) \cdot A\omega^2 \cdot \sin\omega t \\ &= 0,\end{aligned} \quad (7)$$

and $$\begin{aligned}m \cdot \ddot{x} + k \cdot x &= -m \cdot B\omega^2 \cdot \sin(\omega t + \alpha) \\ &\quad + m \cdot B\omega^2 \cdot \sin(\omega t + \alpha) \\ &= 0.\end{aligned} \quad (8)$$

Substituting eqs. (7) and (8) into eqs. (1) and (2), we write:

$$\begin{aligned}P \cdot \cos \omega t &= C\dot{X} + m\ddot{x} \\ &= 2M \cdot h \cdot A\omega^2 \cdot \cos\omega t - \\ &\quad m \cdot B\omega^2 \cdot \sin(\omega t + \alpha),\end{aligned} \quad (9)$$

and $$p(t) = m \cdot \ddot{X} = -m \cdot A\omega^2 \cdot \sin\omega t. \quad (10)$$

Here, eq. (9) shows that, when the two terms on the right side are equal to each other in phase, a force arising from attenuation of the body 17 and a force due to the motion of the weight 18 is in balance with the aeodynamic force P. This means further that, when the motion of the weight 18 is retarded by 90 degrees with respect to the motion of the body 17, a force comes to act in the same direction as the attenuation of the body 17 so as to stop vibration.

Therefore, putting $\alpha = -90$ degrees, we rewrite eq. (9) as:

$$\begin{aligned}P \cos\omega t &= 2M \cdot h \cdot A\omega^2 \cdot \cos\omega t + m \cdot B\omega^2 \cdot \cos\omega t \\ &= (2M \cdot h \cdot A + mB) \cdot \omega^2 \cdot \cos\omega t,\end{aligned} \quad (11)$$

which gives the amplitude B of the weight 18 as:

$$m \cdot B = (P/\omega^2) - 2M \cdot h \cdot A \quad (12)$$

Here, what these equations signify is that, since they hold true whether the damping system concerned is of an active type or a passive type, the force p given by the eq. (10) acts as a controlling force when the damping system is the active type, whereas the same acts as an attenuating force when the system is the passive type.

If the spring constant k is not given by eq. (6), the sum of mx and kx is not zero (see eq. (8)). In this case, eq. (10) needs some modification. Also, if the damping system possesses attenuation force in itself such as friction between the elements constituting the system, those attenuation forces have to be taken in account.

The principle of this invention that has been mathematically presented above may then be understood literally as follows:

(1) the force the damping system generates so as to suppress the vibration of a structure (the tower 1 in this embodiment) is originated from the motion of the mass of the damping system; and, (2) the damping system exerts on the vibrating structure a damping force or a controlling force which is equal to the external force acting on the structure in magnitude but opposite in the direction, so that the vibration of the structure is stabilized.

In still other words, the principle of the present invention consists in converting the energy of, for example, an aerodynamic force that makes the structure vibrate, into kinetic energy of the damping system, and letting the attenuation mechanism of the damping system consume the energy: namely it is a method of indirectly consuming the given energy.

From the foregoing descriptions, it will be understood that the phase difference in displacement between the tower 1 and the weight 5 of the damping system 2 should be 90°. Their displacements are shown in FIG. 6(A), with the solid line indicating the motion of the structure and with the broken line indicating that of the weight. Their velocities (FIG. 6(B)) are obtained by differentiating FIG. 6(A) once, then their accelerations (FIG. 6(C)) are obtained by differentiation FIG. 6(B) once more.

It is on this basis that an acceleration sensor may be employed as the vibration sensor 3 in the present embodiment: by detecting the sway of the tower 1 with the vibration sensor 3 and integrating its signal once, we obtain the velocity signal of the tower 1, and then the displacement signal by integrating the velocity signal. If the displacement signal thusly obtained happens to be greater than the predetermined limit value, we reverse the sign of the tower 1 velocity signal, and feed the reversed signal to the actuator unit of the damping system 2 as the displacement signal of the weight 5. By doing so, we can let the weight 5 oscillate in such a way that its displacement is retarded 90° with respect to that of the tower 1.

Figure 7:
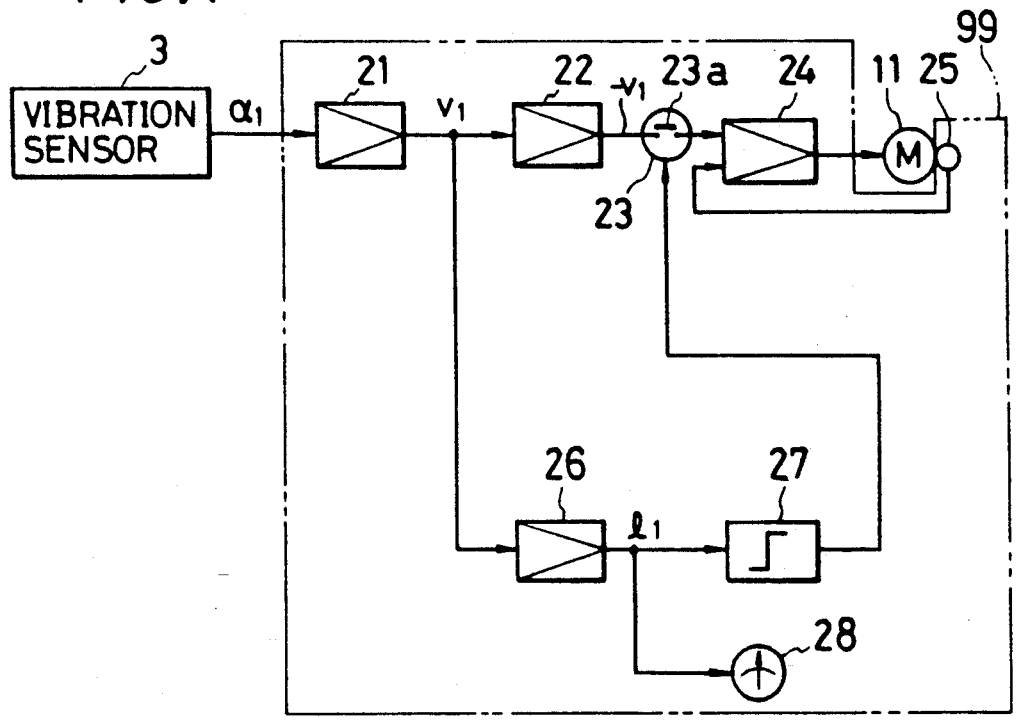
FIG. 7 is a block diagram showing a preferred embodiment of the phase and amplitude controller assembly of this invention.

FIG. 7 shows a block diagram of the phase and amplitude controlling described above. Here, reference numeral 21 is a first integrator that performs an integration on the acceleration signal $a_1$ detected by the vibration sensor 3; 22 an amplifier that reverses the sign of the velocity signal v1, which is the output from the first integrator 21, and transmits it to the motor drive unit 24 of the motor 11 through a contact point 23a of a relay 23; 25 a pulse generator that transmits the feedback signal to the motor drive unit 24 for equalizing the motor 11 revolution with the signal coming from the amplifyer 22; 26 a second integrator that performs an integration on the signal v1 coming from the first integrator 21 so as to obtain the displacement signal $l_1$; 27 a comparator that performs a comparison of the displacement signal $l_1$ with a predetermined limit value; 23 the relay disposed in the comparator and having the contact point 23a which is closed upon excitation of the coil of the relay 23 (introduced earlier on) when the displacement signal $l_1$ is greater than the limit value in the comparator 27, thereby activating the motor 11 to allow the weight 5 to perform a simple harmonic oscillation; and 28 is a displacement meter that displays the output signal of the second integrator 26. Here, the comparator 27, which is there for the purpose of moving the weight 5 when the sway of the tower 1 has exceeded a certain predetermined range, is not a component of absolute necessity, nor is the displacement meter 28 absolutely necessary.

Referring to FIG. 7, as the vibration sensor 3, which is an acceleration detector, detects acceleration of tower 1, its signal $a_1$ is integrated by the first integrator 21, and becomes the velocity signal v1. Next, if the contact point 23a of the relay 23 is still closed, i.e., in the ON position, after the amplifier 22 has reversed the sign of the velocity signal v1, the velocity signal v1 is input to the drive unit 24, whereby the motor 11 starts rotating and the weight 5 starts swinging. Then, the velocity signal v1 is integrated by the second integrator 26 to the displacement signal $l_1$. If the displacement signal $l_1$ is greater than the limit value in the comparator 27, the comparator 27 transmits a signal to the relay 23, which in turn closes the contact point 23a between the amplifier 22 and the motor drive unit 24.

Figure 8:
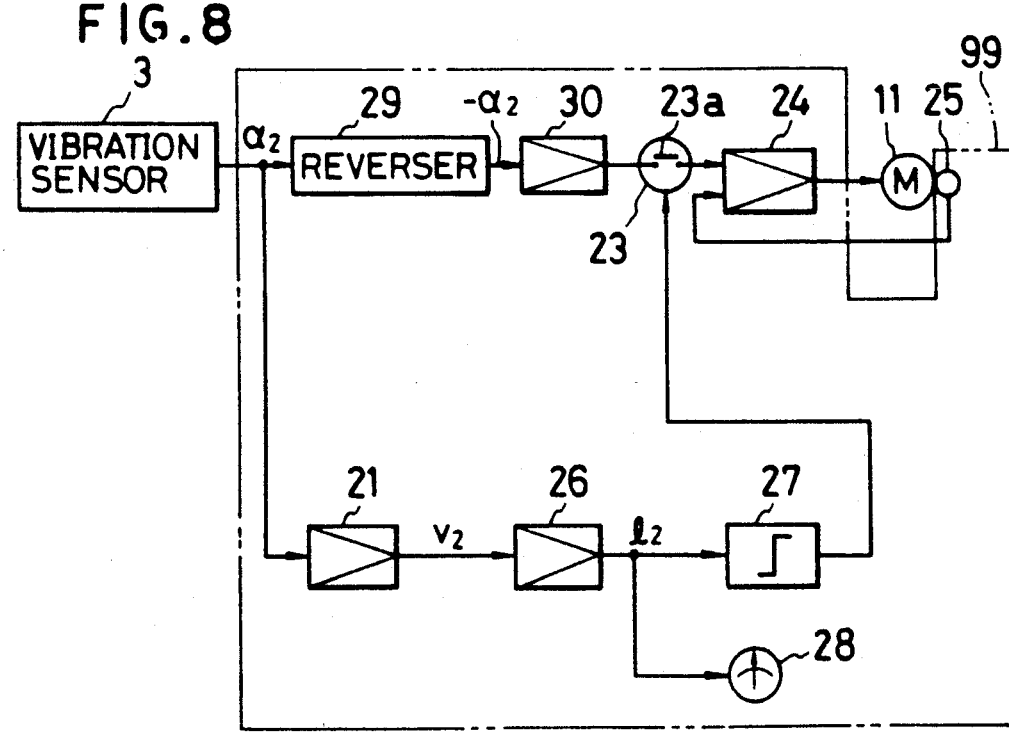
FIG. 8 is a block diagram showing another example of the phase and amplitude controller assembly according to the present invention.

FIG. 8 presents another embodiment of the phase and amplitude controller assembly 99 of the present invention. This construction is based on the fact that, as FIG. 6 shows, movements shown in FIG. 6(A) can be obtained by reversing the sign of the signal of the vibration sensor 3 attached to the tower 1 and by utilizing this signal as the velocity signal to actuate the weight 5, because the signal of the vibration sensor 3 as sign-reversed is the velocity signal of the weight 5.

Namely, in this embodiment, the signal coming from the vibration sensor 3 is sign-reversed by the reverser 29 into $-a_2$, and amplified by an amplitude-amplifier 30, whereby the displacement signal of the weight 5 is obtained. The signal thusly obtained is input to the motor drive unit 24 via the contact point 23a of the relay 23. The subsequent procedure is the same as in the last mentioned case. This embodiment develops much the same effect as the first embodiment presented in FIG. 7.

Figure 17:
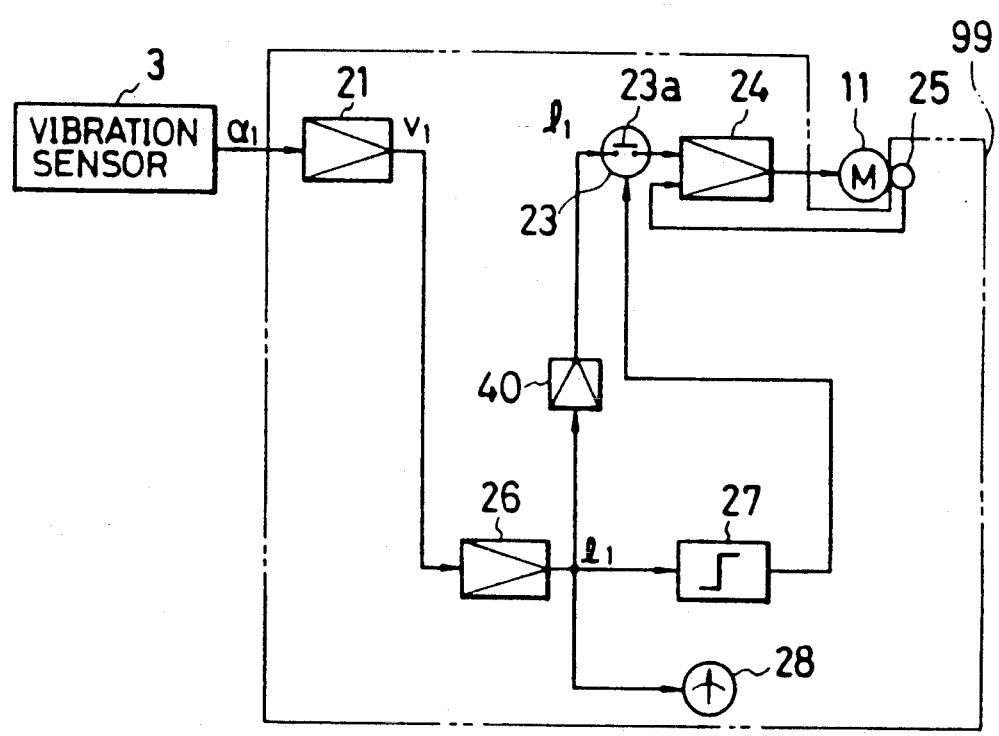
FIG. 17 illustrates still another block diagram of the phase controller assembly according to the present invention.

FIG. 17 shows a modification of the system of FIG. 7. Here, the amplifier 22 is not employed; instead, a phase shifter 40 is provided. The output from the second integrator 26 is delayed by 90 degrees relative to the displacement signal through the phase shifter 40. The signal from the phase shifter 40 is sent to the motor 11 via the relay 23.

Figure 9:
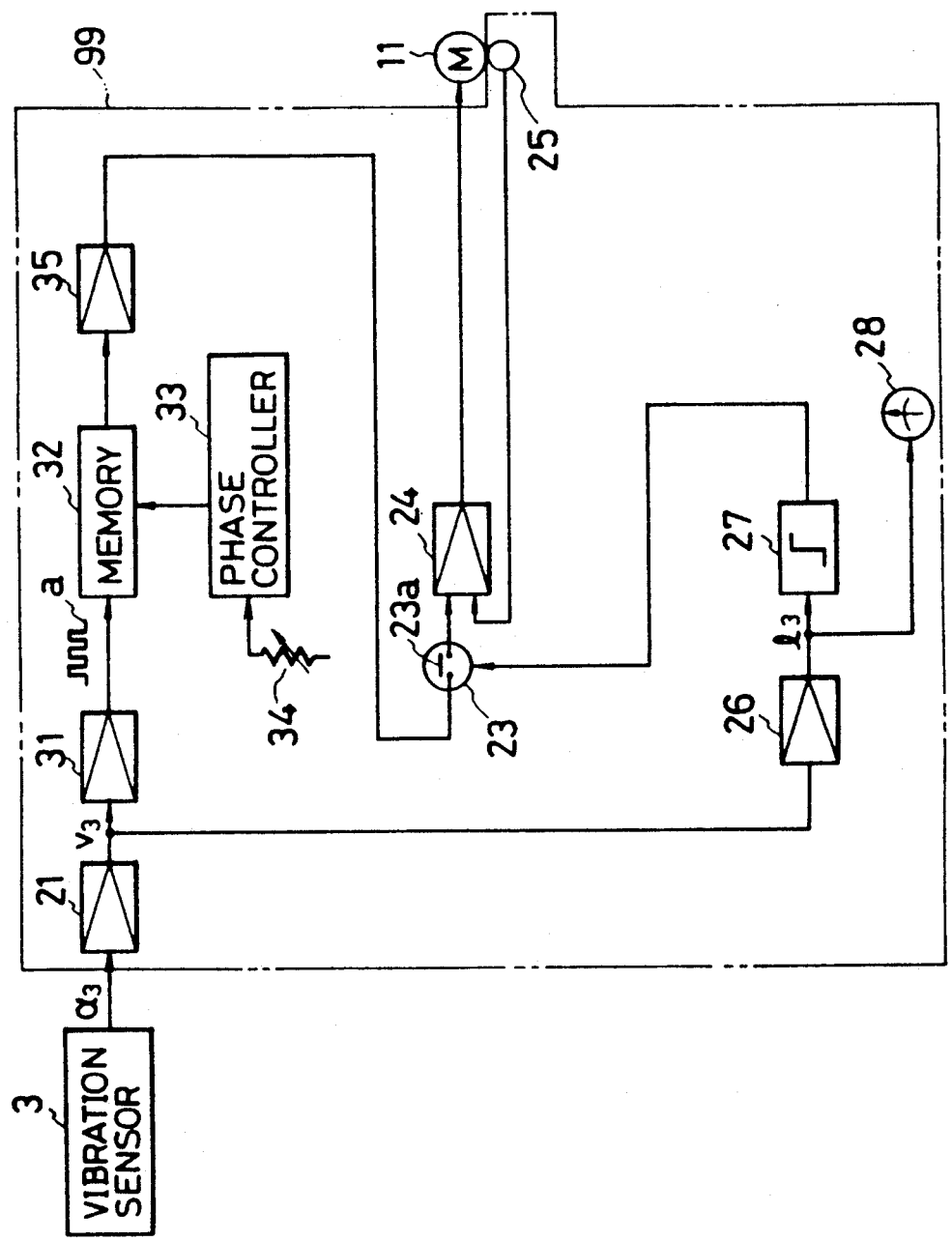
FIG. 9 is a diagram showing still another example of the circuit which includes a device for compensating for the retardation of the servo system.

For either embodiment, however, there is a possibility that the weight drive mechanism and the motor drive unit 24 might delay due to inertia if the tower 1 sways with a short period. FIG. 9 shows another diagram which is provided with a circuit to correct this retardation, in which numeral 31 is an A/D converter that digitalizes the output signals of the first integrator 21; 32 a memory that memorizes the signal data coming from the A/D converter 31 in synchronization with a clock signal at its terminal a; 33 a phase controller that controls the input and output of the data in the the memory 32 by feeding to the memory 32 the phase set by the phase setter 34; and 35 is a D/A converter that converts the data coming from the memory 32 into an analog signal and transmits it to the drive unit 24 through the contact point 23a of the relay 23 as the actuation command.

In the circuit of FIG. 9, the signal $a_3$ of the vibration sensor 3 is converted into the velocity signal $v_3$ through the first integrator 21, and the velocity signal $v_3$ is then input to the memory 32 after being digitized by the A/D converter 31. The memory 32 memorizes the data of the velocity signal $v_3$ for a predetermined number of periods in synchronization with the clock signal fed from the terminal a, and, in the meantime, outputs the data with a predetermined phase retardation upon receiving the command from the phase controller 33 on the basis of the value set in the phase setter 34.

Figure 10:
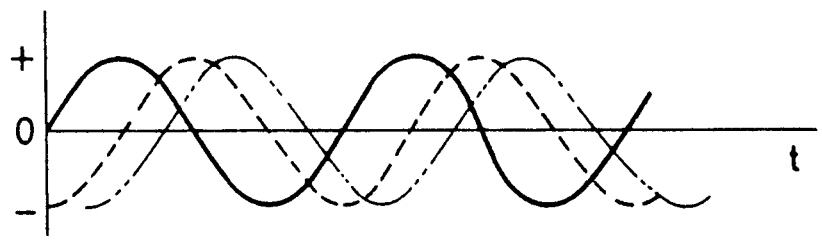
FIG. 10 is a diagram showing the displacement when the retardation of the servo system is left uncompensated.
Figure 11:
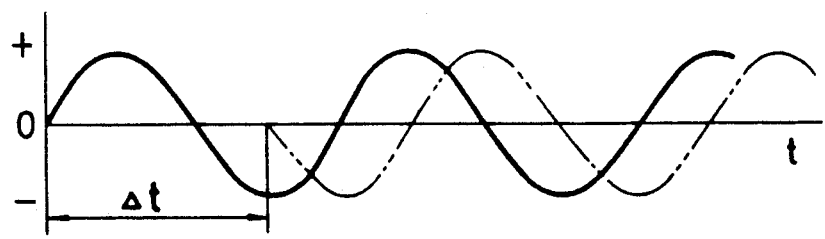
FIG. 11 is a diagram showing the displacement when the retardation of the servo system is properly compensated.
Figure 13:
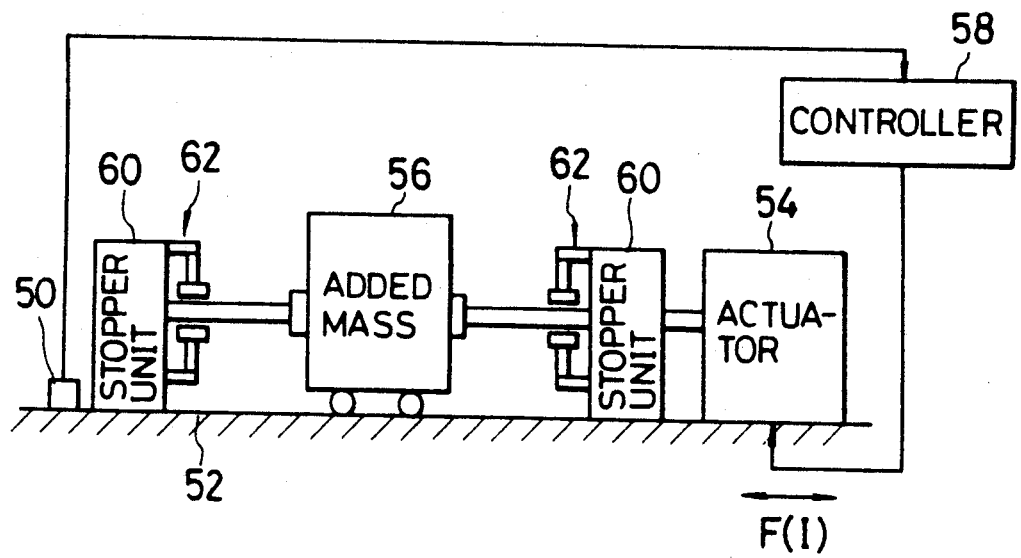
FIGS. 13 through 16 are schematic diagrams showing known arrangements.
Figure 14:
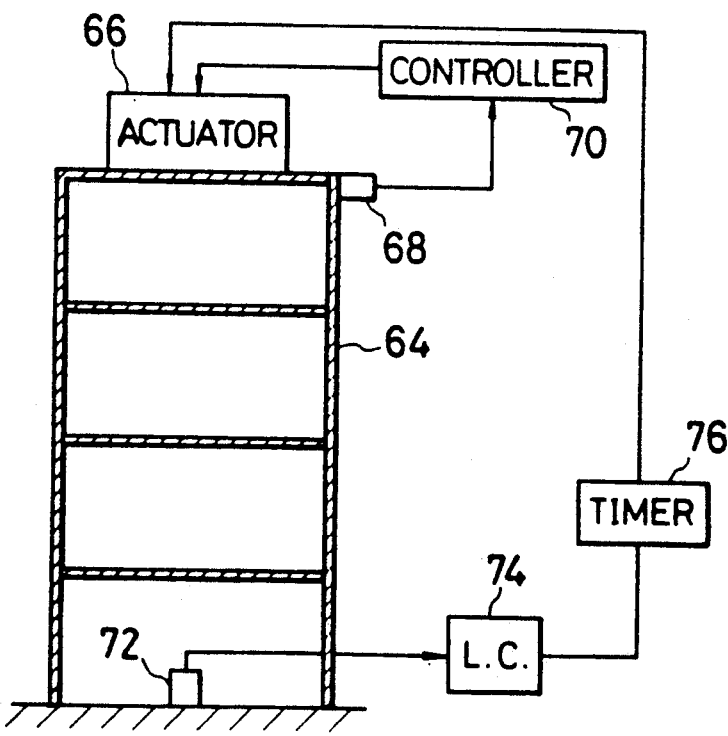
Figure 15A:
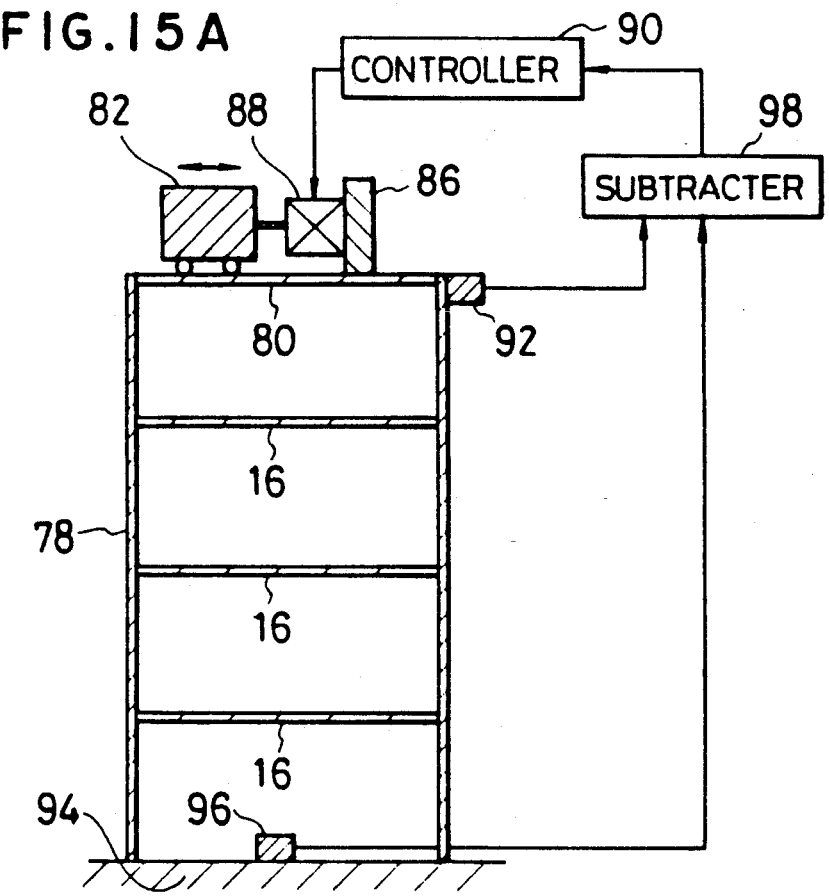
Figure 15B:
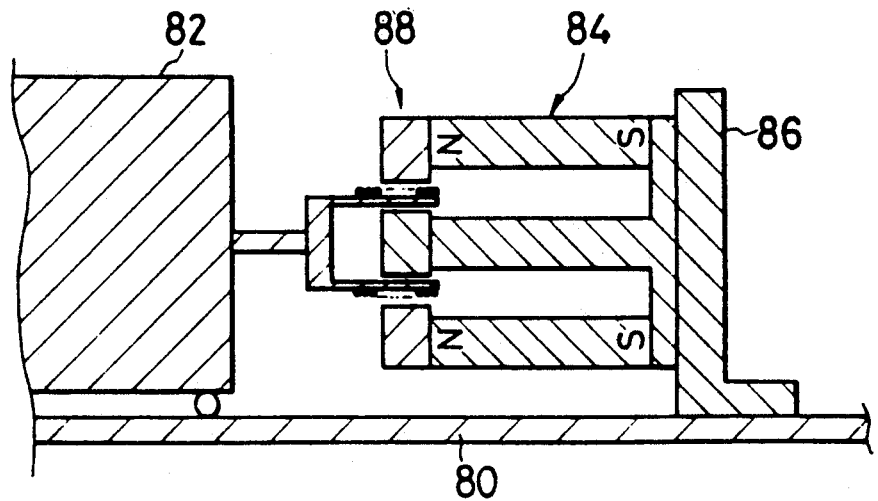
Figure 16:
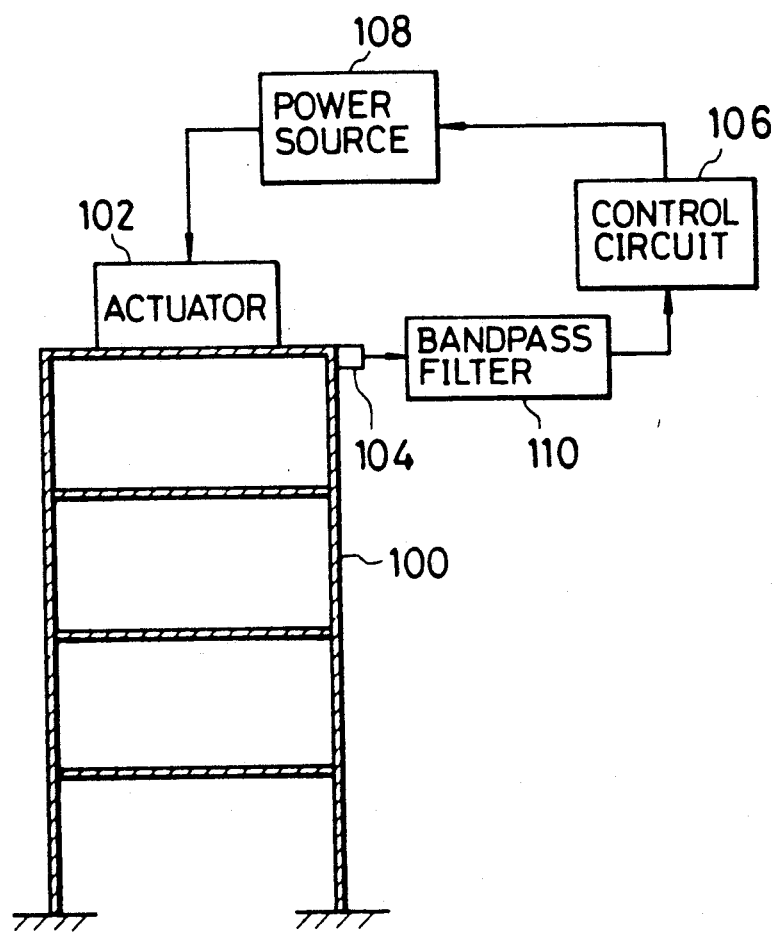

Here, since the memory 32 outputs data at the phase set by the phase setter 34, and because we can set the phase as we wish for any rapid changes in the velocity, we are able to correct for the retardation in the servo system promptly. That is to say, when the memory 32 is not provided, the motion of the weight 5 is retarded due to the servo retardation, as shown by the double-dotted line in FIG. 10, whereas when the memory 32 is provided and a retardation time $\Delta t$ ($\frac{3}{4}$ Hz in this example) is assigned to the servo system, the motion of the weight 5 is properly adjusted, as shown in FIG. 11. In other words, we can compensate for the retardation of the servo system by retarding the phase.

Meantime, referring back to FIG. 3, it should be noted that a compensation value $m_o$, which is given by the following equation, is added to the mass m of the weight 5 when a speed change device is provided inside the oscillation period modifier 14 or between the pinion 13 and the period modifier 14:

$$m_o = I \cdot \left(\frac{n}{l_r}\right)^2$$

where lr represents radius of the pinion 13, I its rotation inertia, and n rotation magnification of the speed change device. In this case, the natural frequency $\omega$ has to be multiplied by $$\left(\frac{m}{m + m_o}\right)^{\frac{1}{2}}$$

The foregoing embodiments have several merits: their control systems are simple, hence the cost is reduced and maintenance is simplified; owing to the use of simple harmonic oscillation, the energy requirement for accelerating the weight 5 into a simple harmonic oscillation is small whereby energy can be saved.

Figure 12:
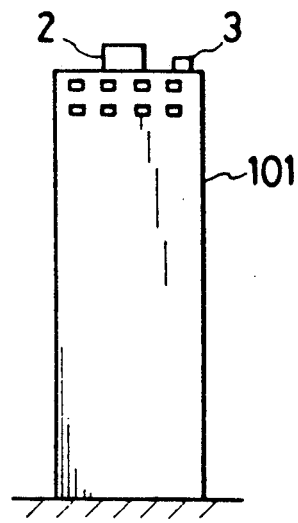
FIG. 12 is a schematic diagram showing a case where the present invention is applied to a tall building.

Moreover, even though the tower 1 has been the sole structure used in disclosing the preferred embodiments, it is evident that the structure can be a skyscraper 101 as shown in FIG. 12, or any other kind of structures. Also, contemplated within the scope of the present invention is a phase advancement control, rather than a phase retardation cited in these embodiments, with regard to the structure vibration, i.e., an application as a shaker, rather than a damper is entirely feasible.

Finally, various other modifications and variations are naturally within the scope of the present invention.

We claim:

1. A structure vibration damping system, comprising:
    a weight disposed at the top of a structure in a manner such that it can undergo simply harmonic oscillations;
    a vibration sensor producing an output signal and being attached to the structure for detecting vibration of the structure, the vibration sensor including an acceleration sensor having an output for delivering an acceleration signal;
    a weight driving mechanism for actuating the weight, the driving mechanism including a motor for causing the weight to undergo simple harmonic oscillation; and
    a phase and amplitude controller connected to the vibration sensor for calculating the amplitude of the structure vibration by processing the output signal of the vibration sensor, for reversing the sign of the vibration sensor output signal when the vibration amplitude of the structure exceeds a predetermined limit value, and for actuating the weight driving mechanism on the basis of the sign-reversed output signal in a manner such that the oscillation of the weight serves as the attenuation force against the structure vibration, the phase and amplitude controller including—
    (a) a first integrator having an output and connected to the output of the acceleration sensor for converting the signal from the acceleration sensor into a velocity signal;
    (b) a second integrator having an output and connected to the output of the first integrator for converting the velocity signal from the first integrator into a displacement signal;
    (c) a comparator having an output and connected to the output of the second integrator for comparing the displacement signal from the second integrator with the predetermined limit value;
    (d) a sign-reverser having an output and connected to the output of an acceleration sensor for reversing the sign of the acceleration signal from the acceleration sensor;
    (e) an amplitude-amplifier having an output and connected to the output of the sign-reverser for amplifying the sign-reversed acceleration signal; and
    (f) a motor driving unit having an input and connected to the output of the amplitude-amplifier for receiving the signal from the amplitude-amplifier when the comparator finds that the displacement signal is greater than the limit value and for actuating the motor based on the signal received from the amplitude-amplifier.

2. A structure vibration damping system, comprising:
    a weight disposed at the top of a structure in a manner such that it can undergo simple harmonic oscillation, the weight being arc shaped;
    a vibration sensor for producing an output signal and being attached to the structure for detecting vibration of the structure, the vibration sensor including an acceleration sensor having an output;
    a weight driving mechanism for actuating the weight, the weight driving mechanism including—
    (a) support rollers for supporting the weight at the top of the structure,
    (b) a rack mounted on the top of the weight,
    (c) a pinion engaging the rack, and
    (d) a motor for rotating the pinion in a manner such that the weight performs simple harmonic oscillation; and
    a phase and amplitude controller connected to the vibration sensor for calculating the amplitude of the structure vibration by processing the output signal of the vibration sensor, for reversing the sign of the vibration sensor output signal when the vibration amplitude of the structure exceeds a predetermined limit value, and for actuating the weight driving mechanism on the basis of the sign-reversed output signal in a manner such that oscillation of the weight serves as an attenuation force against the structure vibration, the phase and amplitude controller including—
    (a) a first integrator having an output and connected to the output of the acceleration sensor for converting the signal from the acceleration sensor into a velocity signal;
    (b) a second integrator having an output and connected to the output of the first integrator for converting the velocity signal from the first integrator into a displacement signal;
    (c) a comparator having an output and connected to the output of the second integrator for comparing the displacement signal from the second integrator with the predetermined limit value;
    (d) a sign-reverser having an output and connected to the output of an acceleration sensor for reversing the sign of the acceleration signal from the acceleration sensor;
    (e) an amplitude-amplifier having an output and connected to the output of the sign-reverser for amplifying the sign-reversed acceleration signal; and
    (f) a motor driving unit having an input and connected to the output of the amplitude-amplifier for receiving the signal from the amplitude-amplifier when the comparator finds that the displacement signal is greater than the limit value and for actuating the motor based on the signal received from the amplitude-amplifier.

3. A structure vibration damping system, comprising:
    a weight disposed at the top of a structure in a manner such that it can undergo simple harmonic oscillation;
    a vibration sensor producing an output signal and being attached to the structure for detecting vibration of the structure, the vibration sensor including an acceleration sensor having an output;
    a weight driving mechanism for actuating the weight, the weight driving mechanism including an oscillation period adjusting weight and a motor for causing the weight to undergo simple harmonic oscillation; and
    a phase and amplitude controller connected to the vibration sensor for calculating the amplitude of the structure vibration by processing the output signal of the vibration sensor, for reversing the sign of the vibration sensor output signal when the vibration amplitude of the structure exceeds a predetermined limit value, and for actuating the weight driving mechanism on the basis of the sign-reversed output signal in a manner such that oscillation of the weight serves as an attenuation force against the structure vibration, the phase an amplitude controller including—

(a) a first integrator having an output and connected to the output of the acceleration sensor for converting the signal from the acceleration sensor into a velocity signal;

(b) a second integrator having an output and connected to the output of the first integrator for converting the velocity signal from the first integrator into a displacement signal;

(c) a comparator having an output and connected to the output of the second integrator for comparing the displacement signal from the second integrator with the predetermined limit value;

(d) a sign-reverser having an output and connected to the output of an acceleration sensor for reversing the sign of the acceleration signal from the acceleration sensor;

(e) an amplitude-amplifier having an output and connected to the output of the sign-reverser for amplifying the sign-reversed acceleration signal; and (f) a motor driving unit having an input and connected to the output of the amplitude-amplifier for receiving the signal from the amplitude-amplifier when the comparator finds that the displacement signal is greater than the limit value and for actuating the motor based on the signal received from the amplitude-amplifier.

* * * * *